(12) United States Patent
Kelkar

(10) Patent No.: US 6,714,940 B2
(45) Date of Patent: Mar. 30, 2004

(54) SYSTEMS, METHODS, AND COMPUTER PROGRAM PRODUCTS TO RANK AND EXPLAIN DIMENSIONS ASSOCIATED WITH EXCEPTIONS IN MULTIDIMENSIONAL DATA

(75) Inventor: Bhooshan P. Kelkar, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 09/998,960

(22) Filed: Nov. 15, 2001

(65) Prior Publication Data

US 2003/0101176 A1 May 29, 2003

(51) Int. Cl.$^7$ .............................................. G06F 17/30
(52) U.S. Cl. ...................................... 707/102; 707/100
(58) Field of Search ..................... 707/1–200; 709/201; 702/65

(56) References Cited

U.S. PATENT DOCUMENTS

| | | | |
|---|---|---|---|
| 5,884,320 A | | 3/1999 | Agrawal et al. ............ 707/104 |
| 5,926,820 A | | 7/1999 | Agrawal et al. ............ 707/200 |
| 5,978,788 A | * | 11/1999 | Castelli et al. ................. 707/2 |
| 6,003,029 A | | 12/1999 | Agrawal et al. ................ 707/7 |
| 6,092,064 A | | 7/2000 | Aggarwal et al. ............. 707/6 |
| 6,094,651 A | | 7/2000 | Agrawal et al. ............... 707/5 |
| 6,108,647 A | * | 8/2000 | Poosala et al. ................. 707/1 |
| 6,438,537 B1 | * | 8/2002 | Netz et al. ...................... 707/3 |
| 6,456,949 B1 | * | 9/2002 | Yamagajo et al. ............ 702/65 |

FOREIGN PATENT DOCUMENTS

WO     WO 01/50245     7/2001    ............ G06F/9/00

OTHER PUBLICATIONS

Pairceir, Ronan et al. (ACM publication, "Discovery of Multi–Level Rules and Exceptions form a Distributed Database", pp. 523–532, Aug. 2000).*

Chaudhuri, Surajit et al. (ACM publication, "An Overview of Data Warehousing and OLAP Technology", pp. 1–10, no date).*

Ronan Pairceir, et al., *Discovery of Multi–Level Rules and Exceptions from a Distrubuted Database*, ACM 2000 1–58113–233–6/00/08 pp. 523–532.

Ronan Pairceir, et al, *Using Hierarchies, Aggregates and Statistical models to discover Knowledge from Distributed Databases*, School of Information and Software Eng., Faculty of Informatics, Univ. of Ulster, Cromore Rd, Coleraine, BT52 ISA, Northern Ireland.

Edwin M. Knorr, et al, *A Unified Notion of Outliers: Properties and Computation*, Department of Computer Science, University of British Columbia, Vancouver, B.C. V6T 1Z4 Canada.

(List continued on next page.)

*Primary Examiner*—Diane D. Mizrahi
(74) *Attorney, Agent, or Firm*—Christine H. Smith

(57) ABSTRACT

Systems, methods, and computer products that rank and explain dimensions associated with exceptions in multidimensional data. The present invention assists the data analyst by providing a simplified view of the multidimensional data that enables analysis of the important results of data exception exploration. Further, the preferred embodiment of the present invention incorporates the effect of weighting factors associated with the importance of the data along with an analysis of the numerical contribution from each dimension. The weighting factors may be based on data mining results or may be obtained from the user. This enables data analysts to obtain information about the value of the data that is presented.

24 Claims, 5 Drawing Sheets

OTHER PUBLICATIONS

Sunita Sarawagi, et al. *Discovery–Driven Exploration of OLAP Data Cubes,* Advances in Database Technology, EDBT 1998, 6$^{th}$ Intl Conf on Extending Database Technology, Valencia, Spain, Mar. 23–27, 1998, Proceedings vol. 1377 pp. 168–182.

Daianos Chatziantoniou, *Ad Hoc OLAP: Expression and Evaluation,* Department of Computer Science, Stevens Institute of Technology.

Sanjay Goil, et al, *A Parallel Scalable Infrastructure for OLAP and Data Mining,* Department of Electrical & Computer Engineering Northwestern University Technological Institute, 2145 Sheridan Road, Evanston, IL 60208.

Pedro Furtado, et al, *Fcompress: A New Technique for Queriable Compression of Facts and Datacubes,* CISUC/ Dept Eng. Informatica Univ. Coimbra Pinhal Marrocos, 3030 Coimbra, Portugal.

Sanjay Goil, etal, *High Performance Data Mining Using Data Cubes on Parallel Computers,* ECE Department and CPDC, Northwestern University Technological Institute, 2145 Sheridan Road, Evanston IL1–60208.

http://www.isye.gatech.edu/~spyros/LP/node1.html, *The LP Formulation and the Underlying Assumptions,* UAL Data Fri Jun. 20, 15:03:05 CDT 1997. (1 page).

http://www.isye.gatech.edu/~spyros/LP/node3.html, *The General LP Formulation.,* UAL Data Fri Jun. 20 15:03:05 CDT 1997 (2 pages).

Kelkar, B., *Exploiting Symbiosis between Datamining and OLAP Business Insights. DM Direct,* Dec. 21, 2001, http://www.dmreview.com/editorial/dmdirect/dmdirect article.cfm?EdID=4446&issue=122101&record=3.

Pairceir, R. et al. *Automated Discovery of Rules and Exceptions from Distributed Databases Using Aggregates,* Principles of Data Mining and Knowledge Discovery, Proceedings of the Third European Conference, PKDD'99 Prague, Czech Republic, Sep. 15–18, 1999, pp. 156–164.

Sarawagi, S., *Explaining Differences in Multidimensional Aggregates,* Proceedings of the 25$^{th}$ International Conference on Very Large Data Bases, Edinburgh, Scotland, UK Sep. 7$^{th}$–10$^{th}$ 1999, pp–42–53.

* cited by examiner

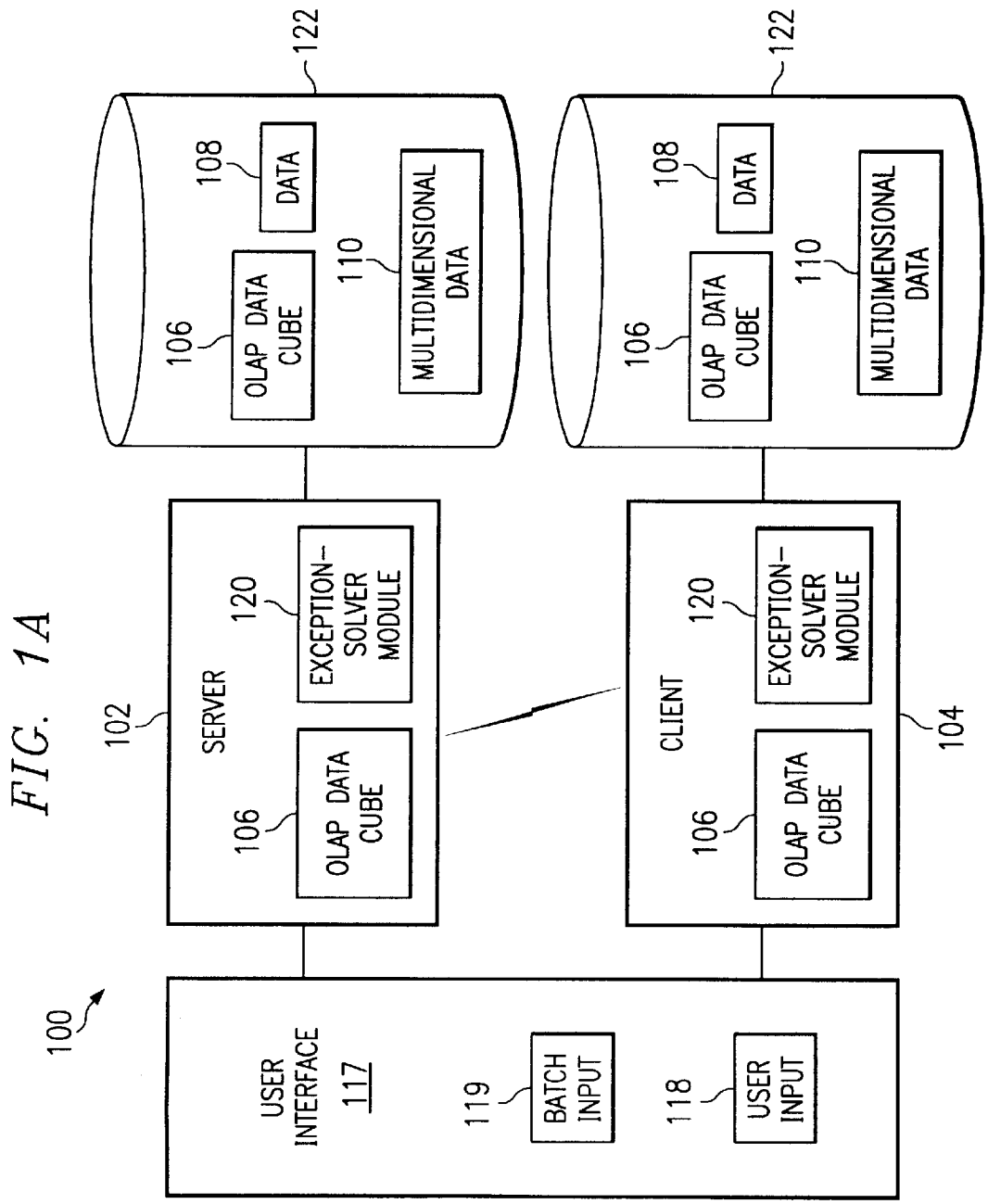

SYSTEMS, METHODS, AND COMPUTER PROGRAM PRODUCTS TO RANK AND EXPLAIN DIMENSIONS ASSOCIATED WITH EXCEPTIONS IN MULTIDIMENSIONAL DATA

CROSS-REFERENCE TO RELATED APPLICATION

In co-pending and pending application Ser. No. 09/998,960, entitled "Systems, Methods, and Computer Program Products to Interpret, Explain, and Manipulate Exceptions in OLAP Multidimensional Data," filed on Nov. 15, 2001, by Bhooshan Kelkar et al., assigned to the assignee of the present invention, and incorporated herein in its entirety by this reference, there is described a method of interpreting, explaining, and manipulating exceptions in multidimensional data. Although not limited thereto, the present invention employs such a method in one of its preferred embodiments.

BACKGROUND OF THE INVENTION

1. Field of the Invention

The present invention is directed to the field of computer-based multidimensional data modeling. It is more particularly directed to ranking and explaining dimensions associated with exceptions in multidimensional data on a computer system

2. Description of the Background Art

On-Line Analytical Processing (OLAP) is a computing technique for summarizing, consolidating, viewing, analyzing, applying formulae to, and synthesizing data according to multiple dimensions. OLAP software enables users, such as analysts, managers and executives, to gain insight into performance of an enterprise through rapid access to a wide variety of data "views" or "dimensions" that are organized to reflect the multidimensional nature of the enterprise performance data. An increasingly popular data model for OLAP applications is the multidimensional database (MDDB), which is also known as the "data cube." OLAP data cubes are often used by a data analyst for interactive exploration of performance data for finding regions of anomalies in the data, which are also referred to as "exceptions" or "deviations." Problem areas and new opportunities associated with the enterprise are often identified when an anomaly in the enterprise data is located.

An exception represents the degree of surprise associated with data that is included in an OLAP data cube. An exception may be defined by means of example. Given a two-dimensional data cube having "p" values along a first dimension "A," and "q" values along a second dimension "B," the element or quantity corresponding to the ith value of dimension A and jth value of dimension B is denoted as, "$y_{ij}$." To estimate the exception, $y_{ij}$, in this data cube, an expected value, "$\hat{y}_{ij}$," of $y_{ij}$ is calculated as a function, "f( )," of three terms: (1) a term "$\mu$" that denotes a trend that is common to all y values of the cube, (2) a term "$\alpha_i$" that denotes special trends along the ith row with respect to the rest of the cube, and (3) a term "$\beta_j$" that denotes special trends along the jth column with respect to the rest of the cube. The residual difference "$r_{ij}$" between the expected value $\hat{y}_{ij}=f(\mu,\alpha_i,\beta_j)$ and the actual value $y_{ij}$ represents the relative importance of the exception, $y_{ij}$, based on its position in the cube.

By means of further explanation, when a data cube has three dimensions, for example, with dimension, "C," being the third dimension, the expected value $\hat{y}_{ijk}$ is calculated by taking into account not only the kth value of the third dimension, but also the three values corresponding to the pairs (i,j) in the AB plane, (i,k) in the AC plane and (j,k) in the BC plane. The expected value $\hat{y}_{ijk}$ is then expressed as a function of seven terms as:

$$\hat{y}_{ijk}=f(\mu,\alpha_i,\beta_j,\gamma_k,(\alpha\beta)_{ij},(\alpha\gamma)_{ik},(\gamma\beta)_{kj}), \quad (1)$$

where $(\alpha\beta)_{ij}$ denotes the contribution of the ijth value in the AB plane, $(\alpha\gamma)_{ik}$ denotes the contribution of jkth value in the AC plane, and $(\gamma\beta)_{kj}$ denotes the contribution of the kjth value in the BC plane. In general, for any k-dimensional cube, the y value can be expressed as the sum of the coefficients corresponding to each of the $2^k-1$ levels of aggregations or group-bys of the cube. The "coefficient" represents a component that provides information used in making predictions about the expected value of $\hat{y}$ and a "group-by" represents different combinations of the dimensions associated with the multidimensional cube. In the present example, group-bys include "AB" and "ABC." Therefore, a coefficient is a group-by component that contributes to predictability of a cell in a multidimensional cube. The coefficient model may be used to make predictions about the expected value of an exception.

By means of example, a three-dimensional cube will be considered. The function, f( ) can take several forms or models, such as an additive form, where function f( ) is a simple addition of all its arguments, and a multiplicative form, where function f( ) is a product of its arguments. It will be appreciated by those skilled in the art that the multiplicative form can be transformed to the additive form by performing a logarithm on the original data values. For a multiplicative model, the $y_{ijk}$ values denote the log of the original y-values of the cube. The log is used to remove bias associated with the distribution. That is, taking the log will tend to normalize the distribution. The choice of the best form of the function depends on the particular class of data, and is preferably selected by a user having understanding and experience with the data at hand. For example, the distribution of the data is one of the factors that may be used to determine the best form of the function.

The final form of Equation One as shown in Equation Two is, $$y_{ijk}=\hat{y}_{ijk}+r_{ijk}=\mu+\alpha_i+\beta_j+\gamma_k+(\alpha\beta)_{ij}+(\alpha\gamma)_{ik}+(\gamma\beta)_{kj}, \quad (2)$$

where $r_{ijk}$ is the residual difference between the expected value $\hat{y}_{ikj}$ and the actual value $y_{ijk}$. The relative importance of an exception is based on the value of its residual. That is, the higher the value of the residual, the higher the importance of the exception.

There are several ways of deriving values of the coefficients of Equation Two. One way of deriving coefficients is shown in U.S. Pat. No. 6,094,651. The approach is a mean-based solution where the coefficients are estimated by taking the logs of all the relevant numbers and then the mean of the previous result. Taking the log will distribute the numbers so that the effect of large differences in the values of the cells is reduced. When the mean is derived a trend may be observed. In general, the coefficient corresponding to any group-by, "G," is recursively determined, according to the mean-based solution, by subtracting the coefficients from group-bys that are at a smaller level of detail than, G, from the average y value at G.

The mean-based approach for calculating the coefficients is not particularly robust in the presence of extremely large numbers that are outliers. An "outlier" represents data that is related to a coefficient that deviates from the trend of the data by a significant amount. There are statistical methods for deciding when to keep or discard these suspected outlier data points. A number of well-known alternative approaches for handling large outliers can be used, such as the Median Polish Method and the Square Combining Method, disclosed by D. Hoaglin et al., *Exploring Data Tables, Trends and Shape,* Wiley Series in Probability, 1988, and incorporated by reference herein. These two alternative approaches are based on using a "median" instead of "mean" for calculating the coefficients. Nevertheless, these alternative approaches have an associated high computational cost. Consequently, the mean-based approach is preferred for most OLAP data sets because significantly large outliers are uncommon in most data sets.

The method for determining a residual, "$r_{ijk}$," may be determined from Equation Two as shown in Equation Three.

$$r_{ijk} = |y_{ijk} - \hat{y}_{ijk}| \tag{3}$$

The greater the value of $r_{ijk}$, the more likely that the cell in the multidimensional data for which an expected value is being calculated is an exception in the data model. However, the residual value may need to be standardized for a meaningful comparison of multidimensional data. A "standardized residual value" is calculated as shown in Equation Four.

$$sr = |y_{ijk} - \hat{y}_{ijk}|/\sigma_{iljk} \tag{4}$$

The step of standardization is performed because the magnitude of the residual may appear to be significantly larger than the other values considered. Considering the magnitude of the residual alone can be misleading because the residual should be evaluated in relation to the data in the neighboring cells. Normalization of the data is achieved by applying a standard deviation to the process. It will be appreciated by those skilled in the art that there are many methods of calculating a standard deviation associated with data in the multidimensional cube. The standardized residual can then be used to rank the exceptions that are found. The higher the value of the standardized residual, the higher is the rank. The first exception in a decreasingly sorted array of exceptions will have the highest value of the standardized residual. A residual approach however is limited since the user views actual data and not the residual details, therefore the interpretation and explanation of an exception is not always obvious to the user.

The process of determining and analyzing a multidimensional cube exception is quantitative, while the analyst would like to use a qualitative approach. The information that is viewed in a quantitative approach, such as the coefficient approach, can be overwhelming. This happens because the number of possible two-dimensional or three-dimensional views that spawn three or two dimensions from the OLAP multidimensional sub-cube increases steeply. The number of possible three-dimensional views for N dimensions are $(N)*(N-1)*(N-2)/6$ and two-dimensional views are $(N)*(N-1)/2$. For example, if we have a cube with 7 dimensions, then the number of views for the end-user to analyze, "C," are $C=(7*6)/2=21$ for two-dimensional views, and $C=(7*6*5)/6=35$ for three-dimensional views. In the absence of any formal way to focus on a few dimensions, the analyst has to view all thirty-five or twenty-one views to identify the best view for an exception, which makes it difficult to interpret and explain an exception.

There is a solution described in U.S. Pat. No. 6,094,651 that addresses exceptions and uses the concept of maximal terms. In general, a coefficient approach is limited since large coefficients are typically associated with smaller dimensional terms and the explanations are often too broad, spanning more data than necessary. This method looks at two-dimensional or three-dimensional views. However, the views are used for analysis rather than to examine individual dimensions. This limits the amount of data that is used to determine trends in the data.

Missing values are not considered in current exception-related solutions. For example, in a dimension in which a portion of the cells have no value the coefficient approach or the residual approach may generate information that indicates a more significant exception than actually exists.

Another limitation in the current solutions is that linguistic labels are not often assigned to an exception. The information is presented in a quantitative manner instead of a qualitative manner. This limits data analysts from easy access to information about the value of the data that is presented. Therefore, it is difficult for data analysts to make use of the available multidimensional data.

When an OLAP data cube has a large number of dimensions, such are ten or more, it is likely that the contribution to the exception graph may have many dimensions having contributions only slightly different. Then ranking these dimensions purely based on their density and numerical contribution may not provide enough information for an optimal display of the results.

Yet another limitation of the current solutions is that they lack a more formal and efficient way of assisting the data analyst with the view of simplifying the analysis of results of exception exploration.

From the foregoing it will be apparent that there is still a need to improve the interpretation, explanation, and manipulation of exceptions in multidimensional data on a computer system.

SUMMARY OF THE INVENTION

An embodiment of the present invention relates to systems, methods, and computer products that rank and explain dimensions associated with exceptions in multidimensional data on a computer system. The present invention is related to the field of computer-based multidimensional data modeling often used by data analysts. The present invention assists the data analyst by providing a simplified view of the multidimensional data that enables analysis of the important results of data exception exploration.

The preferred embodiment of the present invention operates with an exception-solver module and enables determination and analysis of an exception in a multidimensional data cube by a qualitative approach. The overwhelming amount of information that may be viewed in a quantitative approach is reduced to the important information, according to the present invention. More particularly, the preferred embodiment of the present invention enables ranking and explanation of dimensions associated with selected exceptions in multidimensional data.

Further, the preferred embodiment of the present invention incorporates the effect of weighting factors associated with the importance of the data along with an analysis of the numerical contribution from each dimension. That is the preferred embodiment of the present invention assigns weighting factors associated with the importance of a dimension. The weighting factors may be based on data mining results or may be obtained from the user. When the weighting factors are based on data mining results, the preferred embodiment of the present invention resolves results obtained from a plurality of data mining runs to arrive at a set of weighting factors for different dimensions.

The preferred embodiment of the present invention also provides the framework necessary to assign linguistic meaning to relative dimensions associated with each exception. This enables data analysts to obtain information about the value of the data that is presented in a more formal and efficient manner. The information about the dimension may also be presented visually.

An embodiment of the present invention is achieved by systems, methods, and computer products that rank and explain dimensions associated with exceptions that are selected from multidimensional data. The method comprises (a) associating at least one dimension with each selected exception; (b) obtaining weighting factors for certain associated dimensions by either (i) taking information from the user, (ii) or performing data mining runs for the data, or (iii) invoking the results of pre-computed data mining results on the data; (c) ranking the dimensions that are associated with each selected exception by numerical importance; (d) identifying the dimensions that need to be re-evaluated for possible re-ranking related to the exception of the multidimensional data; (e) re-ranking the dimensions based on the weighting factors; and (f) then visually or linguistically presenting the corrected contributions for selection of the best and most important two-dimensional or three-dimensional view for the exception.

Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

FIG. 1A is a block diagram that illustrates the present invention;

DESCRIPTION OF THE INVENTION

Figure 1B:
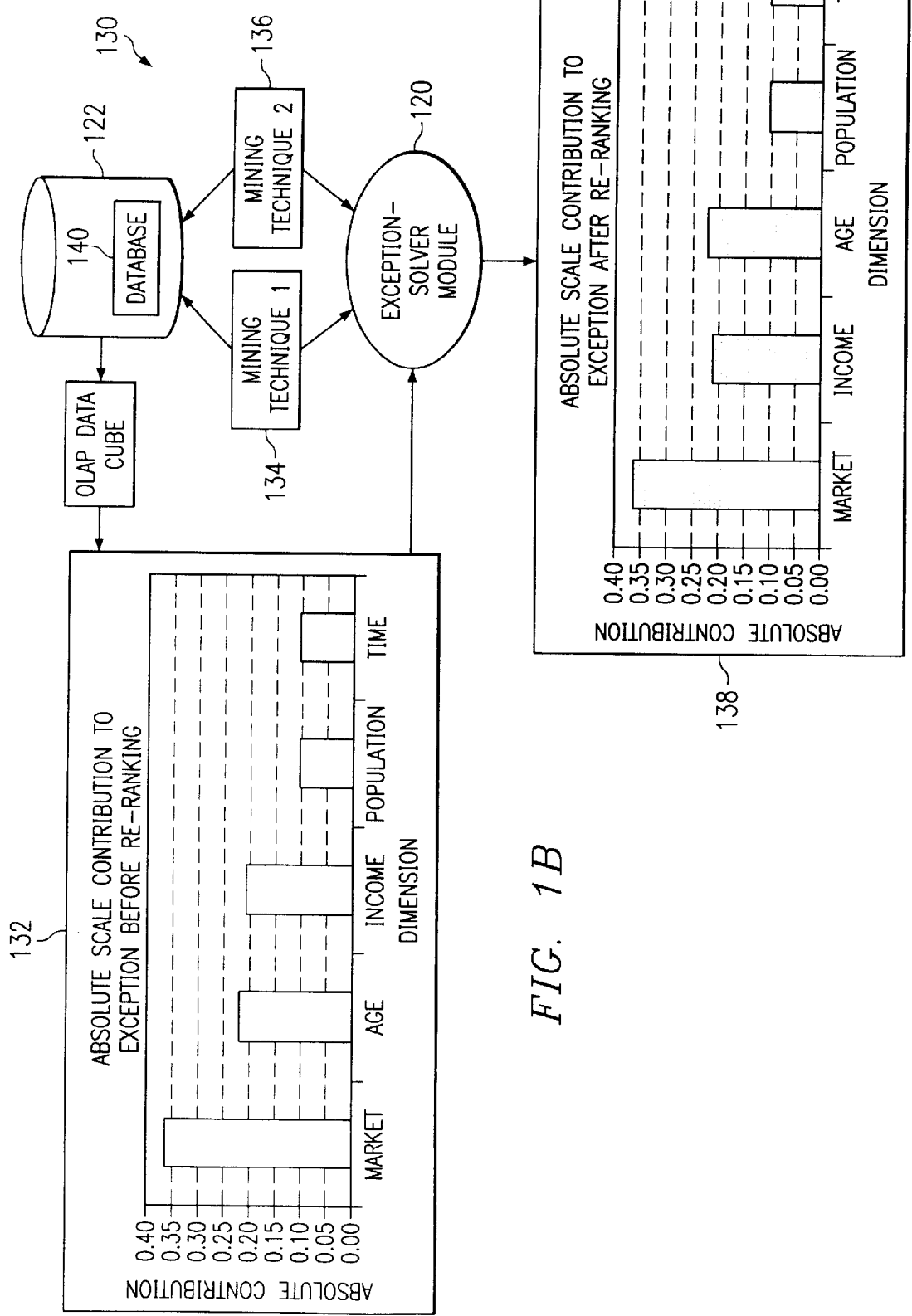
FIG. 1B is a block diagram that further illustrates the present invention.

As shown in the drawings and for purposes of illustration, the preferred embodiment of the invention novelly interprets and explains exceptions in multidimensional data on a computer system. The present invention assists the data analyst by providing a simplified view of the multidimensional data that incorporates the effect of weighting factors associated with the importance of the data along with an analysis of the numerical contribution from each dimension and the data density associated with each dimension. Existing systems have not been able to efficiently and adequately interpret and explain exceptions from selected multidimensional data that includes weighting factors representing the importance of the multidimensional data.

The overwhelming amount of information that may be viewed in a quantitative approach is reduced to the important information, according to the present invention. More particularly, the preferred embodiment of the present invention assigns weighting factors associated with the importance of a dimension. The weighting factors may be based on data mining results or may be obtained from the user.

The preferred embodiment of the present invention advantageously incorporates the weighting information with an analysis of the numerical contribution from each dimension and the data density associated with each dimension. This incorporation of a variety of information useful in ranking the importance of a contribution to an exception expands the information available to the data analyst over solutions of the past. Further, the operation of the present invention enables the data analyst to rearrange the dimensions for selection of two-dimensional or three-dimensional views of an exception better than in the past. This enables the data analyst to efficiently decide on the best and most important view of a dimension.

As shown in FIG. 1A and in element 100, the preferred embodiment of the present invention may operate in a client-server computer system configuration. Therefore, a client computer system 104 may communicate with a server computer system 102 during the operation of the present invention. The exception-solver module 120 operates in either the client 104 or the server 102 to perform the preferred embodiment of the present invention. For example, information may be communicated to either the server 102 or the client 104 via the user interface 117. Through such communication threshold information may be established and may subsequently be used by the exception-solver module 120 to manipulate data 108, such as multidimensional data 110, according to the operation of the present invention. The user interface 117 may communicate with the preferred embodiment of the present invention, either via batch input 119 or user input 118.

Further, an OLAP data cube 106 may be configured in the memory 658 of either the client 104 or the server 102. Alternatively, the OLAP data cube 106 may be configured in computer storage such as that of a disk 122. Typically, the OLAP data cube 106 is configured in computer storage of a disk 122 associated with a client 104. The terms "OLAP data cube" and "data cube" will be used interchangeably herein. Element 658 is described with reference to FIG. 6.

FIG. 1B, and in element 130, illustrates the preferred embodiment of the present invention operating in a computer system. Therefore, the OLAP data cube 106 is built on a database 140 and exceptions 214 are found in the OLAP data cube 106. The Absolute Scale Contribution to Exception Before Re-ranking 132 shows the absolute contribution 218 of dimensions 216 for an exception 214 before the operation of the present invention. The weighting factors 224 may be defined by a variety of mining techniques, represented herein by elements 134 and 136. Therefore, mining technique_1 134 and mining technique_2 136 operate on the same database 140 and pass the results of the data mining runs to the exception-solver module 120. The database 140, and mining technique_1 134 and mining technique_2 136 may be stored on the disk 122. The exception-solver module 120 then uses the Absolute Scale Contribution to Exception Before Re-ranking 132 and the results from multiple data mining runs herein represented by elements 134 and 136 to re-rank the dimensional contributions 218 to the exception 214. The re-ranking is shown in element 138. Thus, the data analyst is better placed to select the dimensions for two-dimensional or three-dimensional views. Elements 214, 216, 218, and 224 are described with reference to FIG. 2.

Figure 2:
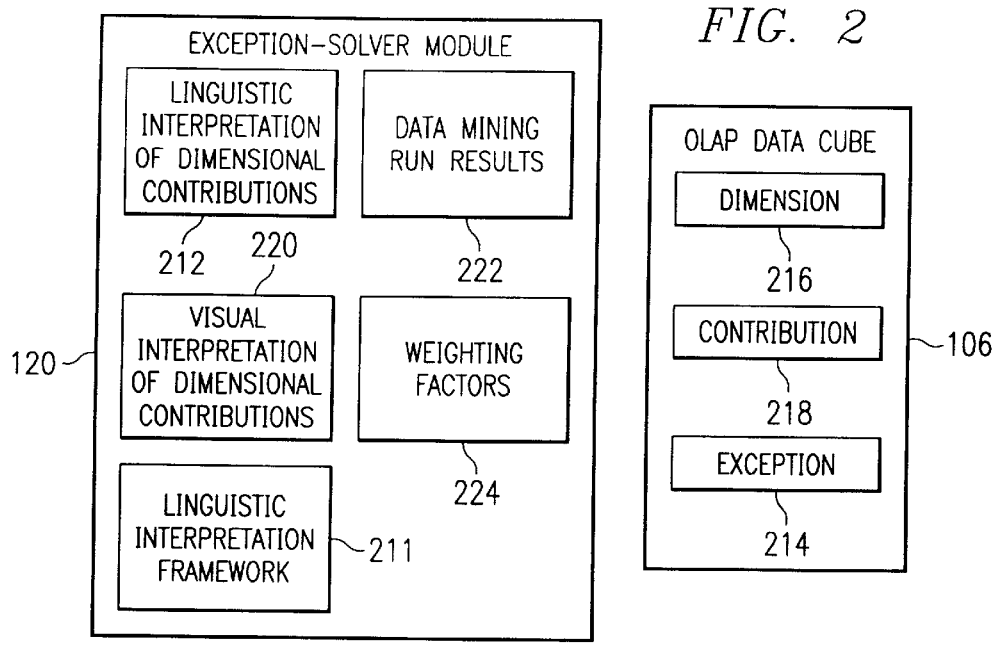
FIG. 2 is a block diagram that illustrates the exception-solver module and the OLAP data cube.

As shown in FIG. 2, the OLAP data cube 106 includes the following elements: the exception 214, the dimension 216, and the contribution 218. The dimension 216 may be represented as a row or column in an OLAP data cube 106 and is organized to reflect the multidimensional nature of the enterprise performance data 108. The exception-solver module 120 interprets contributions 218 associated with the dimension 216. The exception 214 represents regions of anomalies in the multidimensional data 110 and at least one dimension 216 is associated with each selected exception 214.

Figure 6:
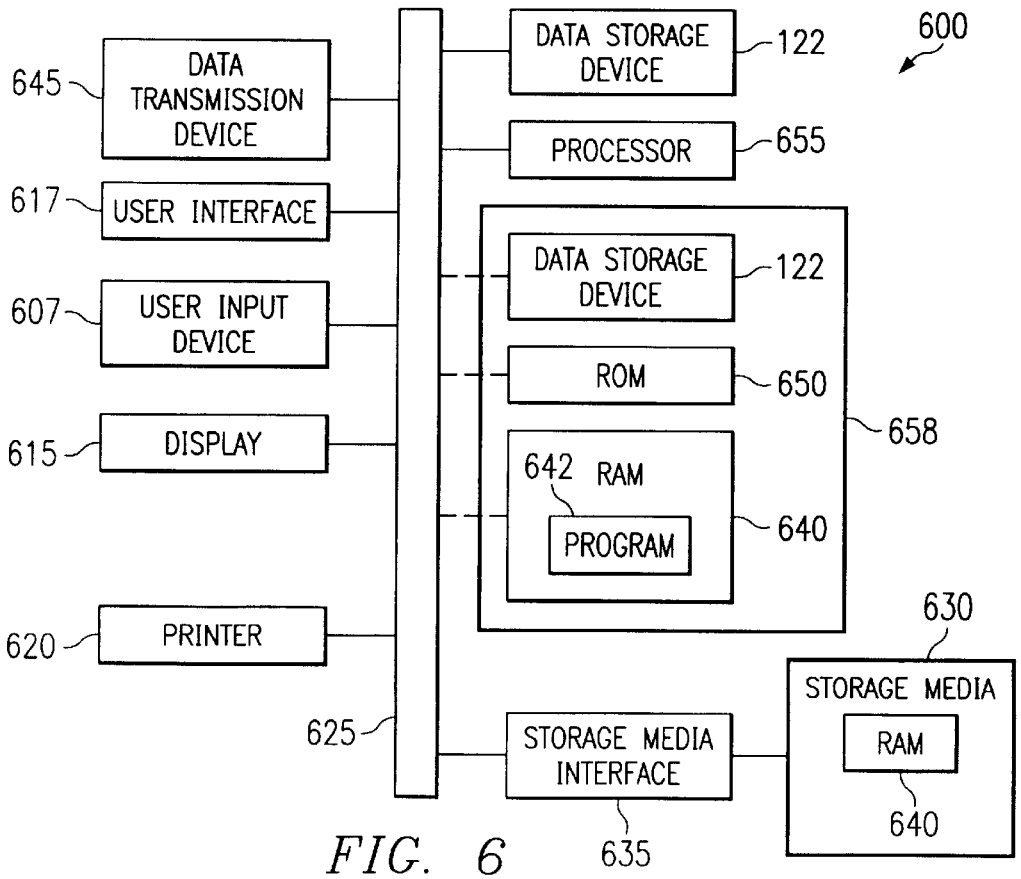
FIG. 6 is a block diagram of a computer system suitably configured for employment of the present invention.

The exception-solver module 120 includes elements used in the preferred embodiment of the present invention. The exception-solver module 120 is typically program code that may be embodied as a computer program 642 (as shown in FIG. 6). The exception-solver module 120 includes weighting factors 224 that are associated with the importance of a dimension 216. The exception-solver module 120 also uses data mining run results 222 that associate relative importance to dimensions 216.

The exception-solver module 120 includes a linguistic interpretation of dimensional contributions, as shown in element 212. The linguistic interpretation framework 211 is used by the preferred embodiment of the present invention to determine the linguistic interpretation 212. The linguistic interpretation 212 is used to describe relationships among the important multidimensional data 110 to the data analyst. Therefore, sorted dimensions 216 may be represented by a linguistic interpretation 216 via the linguistic interpretation framework 211. The exception-solver module 120 also includes a visual interpretation of dimensional contributions, as shown in element 220, that visually represents the normalized density-corrected contribution 210.

Figure 3:
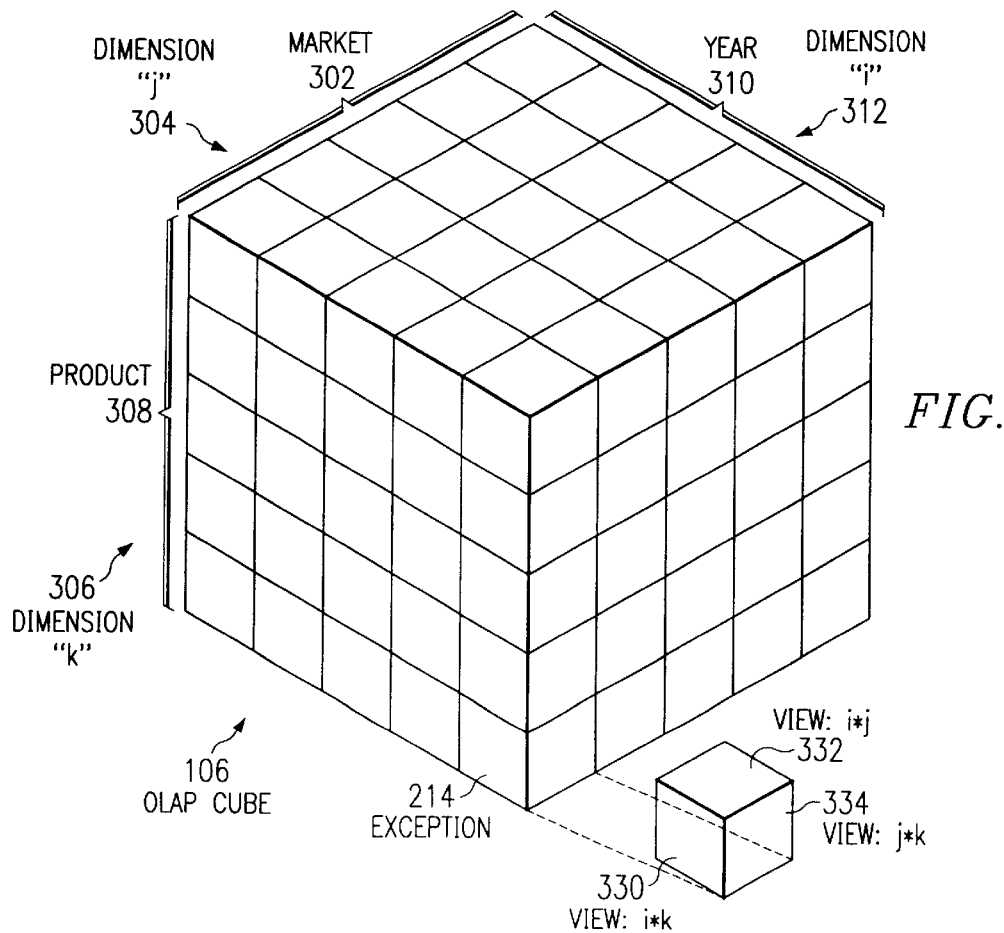
FIG. 3 is a block diagram of an OLAP data cube that is suitably configured for operation with the present invention.

As shown in FIG. 3, an OLAP data cube 106 is suitably configured for operation with the present invention. Therefore, by means of explanation, an example of the operation of the present invention is described. The dimension 216 is herein represented by dimension "i" 312, dimension "j" 304, and dimension "k" 306. Further dimension "j" herein represents market data 302, dimension "k" 306 herein represents product data 308, and dimension "i" 312 herein represents year data 310. An example in the multidimensional cube 106 of an exception 214 is a three-dimensional cell. Further, the three-dimensional cell may be shown to have dimensions 216 or views. Here, there are three views: view "i*j" 332, view "j*k" 334, and view "i*k" 330.

Figure 4:
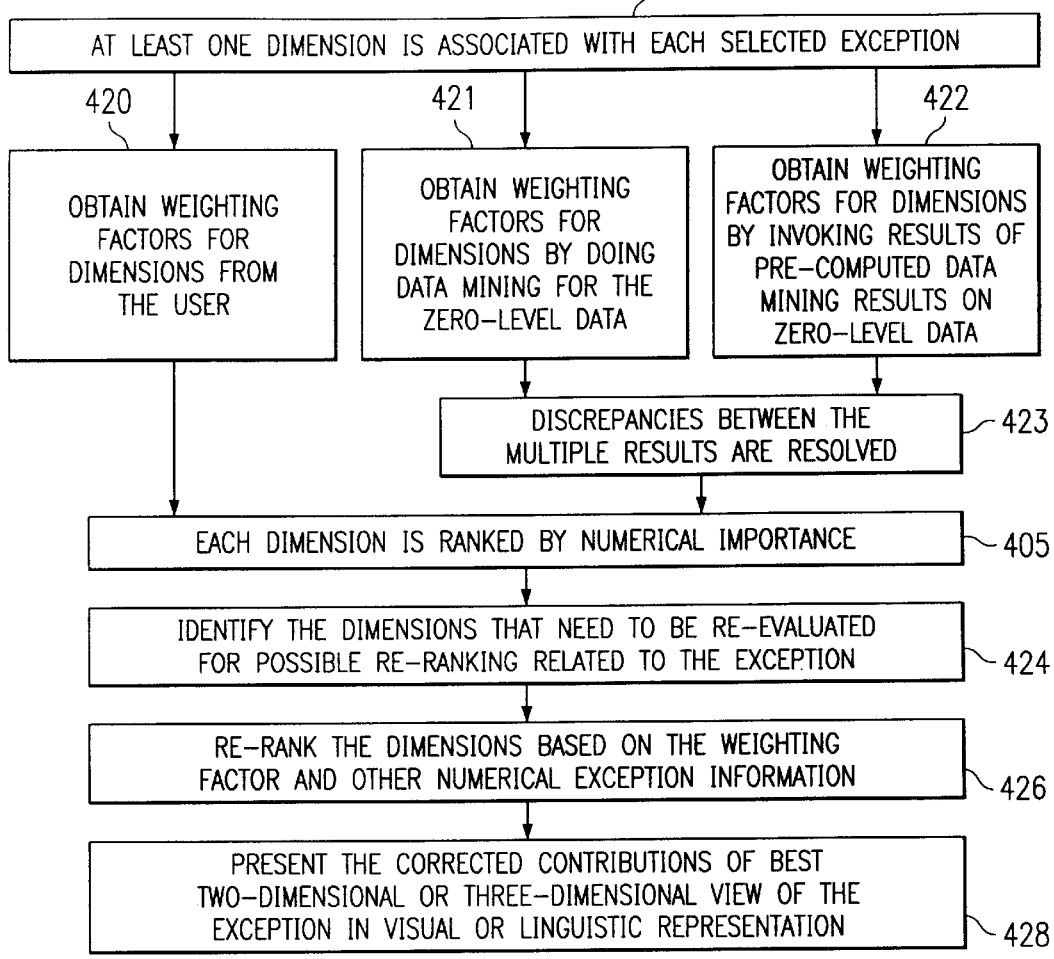
FIG. 4A is a flow diagram that illustrates the method of present invention.

FIG. 4 and element 401 illustrate the preferred method of the present invention that re-ranks dimensions 216 associated with exceptions 214 in multidimensional data 110. The dimension re-ranking may be based on data mining results or on user input 118. Initially, as shown in element 403, at least one dimension 216 is associated with each selected exception 214. That is, at least one dimension 216 is identified. An identified dimension 216 may be generational, or non-generational if no generational structure dimension 216 is associated with a first generation dimension 216. The user may define an exception 214 that may include any combination of dimensions 216. Elements 214 and 216 are described with reference to FIG. 2.

Then, the dimension information is used to obtain weighting factors 224. The weighting factors 224 may be obtained from the user, such as a data analyst, as shown in element 420. Alternatively, the weighting factors 224 may be obtained by using the results of data mining run results 222 for data 108, such as zero-level data 108, as shown in element 421. Those skilled in the art will appreciate that zero-level data is non-aggregated data 108 that has not been manipulated by data mining. In yet another alternative, the weighting factors 224 for dimensions may be obtained by invoking the results of pre-computed data mining run results 222 on data, such as zero-level data 108, as shown in element 422. While zero-level data 108 is more efficiently manipulated by the preferred embodiment of the present invention than higher-level data 108, the present invention may be practiced on other types of data 108 and is not limited to zero-level data 108. Element 108 is described with reference to FIG. 1, and elements 222 and 224 are described with reference to FIG. 2.

If data mining is used to determine the weighting factors 224 and if multiple data mining runs 222 are used, discrepancies between the multiple results are resolved, as shown in element 423. Linear programming methods may be used to resolve the multiple results. The dimensions 216 that are associated with each selected exception 214 are ranked by numerical importance, as shown in element 405. After the weighting factors 224 are obtained, the dimensions that need to be re-evaluated are identified, as shown in element 424. The need for re-evaluation is for possible re-ranking of the dimension 216 as it is related to the exception 214.

Then, as shown in element 424, the dimensions 216 that need to be re-evaluated for possible re-ranking related to the exception 214 are identified. Then, as shown in element 426, the dimensions 216 are re-ranked based on the weighting factors 224 and other numerical exception information. The re-ranked information is presented so that the data analyst may select the best two-dimensional or three-dimensional view of the exception, as shown in element 428.

Figure 5A:
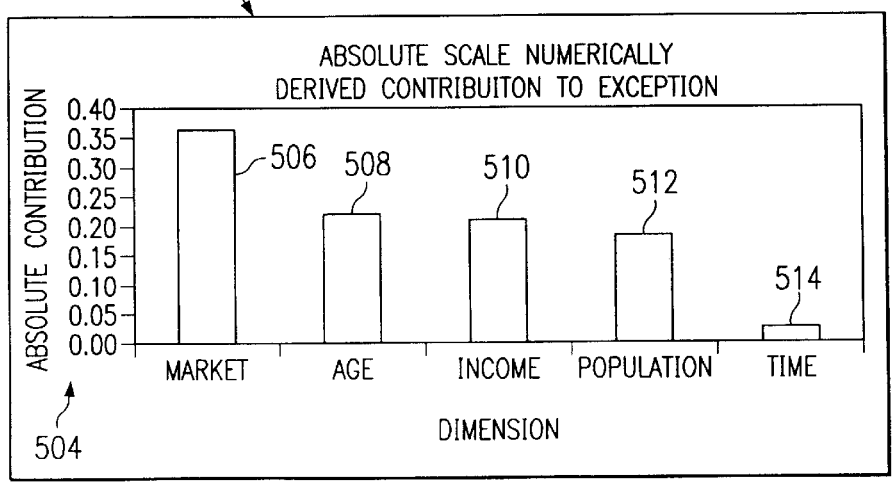
FIG. 5A is a block diagram that illustrates an example of dimension-wise contributions on an absolute scale.

By means of example, FIG. 5A and element 502 illustrate absolute scale numerically derived contributions 218 to exceptions 214. In the present example, the exception 214 relates to a five-dimensional analysis for sales data 108. The five dimensions intersecting at this exception 214 include: "Market," as shown in element 506, "Age," as shown in element 508, "Income," as shown in element 510, "Population," as shown in element 512, and "Time," as shown in element 514. By means of explanation of this example, let the exception be at Market equals San Francisco, Age equals 39, Income equals 45,000, Population equals 700,000, and Time equals 1999. Elements 214, 216, and 218 are described with reference to FIG. 2.

In the present example, the importance of dimensions 216 associated with the exception 214 is calculated according to the operation that is described in U.S. patent application Ser. No. 09/998,955. The contributions 218 associated with the dimensions 216 are numerically analyzed and the associated dimensions 216 are arranged according to descending importance as shown in Table 1. Therefore, from the rearranged dimensions based only on numerical analysis, the best view is Market*Age. However, the relationships between the following dimensions 216 are within a predetermined confidence limit that triggers possible re-arrangement of the dimensions: the dimension "Age" 508, the dimension "Income" 510, and the dimension "Population" 512. In this example the confidence limit for an exception contribution, as shown in element 218, is 0.05. For example, the "contribution from Age" minus the "contribution from Income" equals 0.01, which is less than 0.05. Thus, the importance values associated with three dimensions 216 are very close and therefore there are three candidates for rearrangement: the dimension "Age" 508, the dimension "Income" 510, and the dimension "Population" 512

TABLE 1

Dimensions Arranged by Numerical Calculation

| Rearranged dimensions | Market | Age | Income | Population | Time |
|---|---|---|---|---|---|
| Cd | −.0365 | 0.22 | 0.21 | 0.185 | −0.02 |
| Contribution \|Cd\| | 0.365 | 0.22 | 0.21 | 0.185 | 0.02 |

In the present example, the user has no input for the relative importance among the dimensions 216. While user input 118 is ascribed the highest priority, since there is no user input 118, the weighting factors 224 for the dimensions 216 are obtained from data mining run results 222. The information that is generated by techniques based on Principle Component Analysis (PCA) data mining is used by those skilled in the art for numerical data analysis of multidimensional data 110. PCA is used to discover and possibly reduce the dimensionality of a set of multidimensional data 110. Therefore, via PCA, the "Income" dimension, as shown in element 510, is determined to be more important than the "Population" dimension, as shown in element 512. More particularly, as a result of the PCA data mining technique, the importance of the "Income" dimensions, as shown in element 510, is determined to be about 1.5 times that of the "Population" dimension, as shown in element 512. Elements 110 and 118 are described with reference to FIG. 1, and elements 222 and 224 are described with reference to FIG. 2.

The results obtained from a second data mining technique, clustering, indicate that the "Population" dimension, as shown in element 512, is more important than the "Age" dimension, as shown in element 508. More particularly, the "Population" dimension, as shown in element 512 is about twice the importance of the "Age" dimension, as shown in element 508. Clustering is a generic term that represents a technique that attempts to group multidimensional data 110 on the basis of similarity in the multidimensional data 110.

A linear programming method is used in the present example to resolve discrepancies between the multiple data mining run results 222, as discussed with reference to element 423. The linear programming method is enlisted when the values of contributions 218 associated with dimensions 216 from data mining run results 222 are within a confidence level. Therefore, the following variables are used to represent importance: X1 represents the importance of the dimension "Income" 510, X2 represents the importance of the dimension "Population" 512, and X3 represents the importance of the dimension "Age" 508. The standard objective function is: Maximum (X1+X2+X3) or Minimum (−X1−X2−X3). Element 423 is described with reference to FIG. 4.

The constraints used in the analysis include the following relationships. Given a confidence limit "d1," the PCA result implies that zero is less than or equal to (2*X1−3*X2). Also (2*X1−3*X2) is less than or equal to d1. Also, given a confidence limit of "d2," the Clustering result implies that zero is less than or equal to (2*X1−3*X2). Also (2*X1−3*X2) is less than or equal to d2. Those skilled in the art will appreciate that d1 and d2 should be set to sufficiently small values to ensure an accurate analysis, such as five percent.

A boundary condition used in the analysis is that the values of X1, X2, and X3 must be between zero and one. Also, the sum of (X1+X2+X3) must be less than or equal to one and greater than or equal to zero.

For the purposes of explanation, data 108 associated with each dimension 216 is shown in Table 2. Further, Table 2 shows the results for the importance of the following dimensions as a result of the data mining run results 222 that have been resolved by linear programming: the dimension "Income" 510, the dimension "Population" 512, and the dimension "Age" 508. Therefore, the "Income" dimension, as shown in element 510 and having an importance value of 0.525, is determined to be more important than the "Population" dimension, as shown in element 512 and having an importance value of 0.333. Also, the "Age" dimension, as shown in element 508 has an importance value of 0.142.

TABLE 2

Importance of Dimension from Data Mining Analysis

| Dimension | Importance |
|---|---|
| Income | 0.525 |
| Population | 0.333 |
| Age | 0.142 |

Figure 5B:
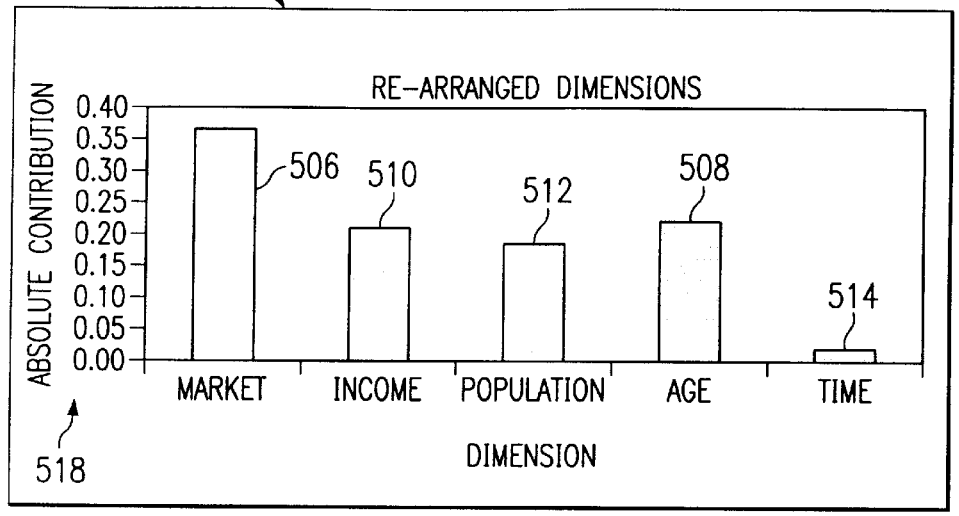
FIG. 5B is a block diagram that illustrates an example of relative contributions.

FIG. 5B and element 520 illustrate an example of the operation of the present invention. The absolute contribution 518 is identified in FIG. 5B. Therefore, based on linear programming resolution of data mining results the following dimensions 216 are listed in decreasing order of importance: the dimension "Income" 510, the dimension "Population" 512, and the dimension "Age" 508. The importance of dimensions 216, derived from numerical contribution, and in decreasing order follows: the dimension "Age" 508, the dimension "Income" 510, and the dimension "Population" 512. Therefore, since the data mining run results 222 take precedence over the numerical calculation, when the value of the dimensions 216 are within a defined confidence level, the visual representation of the information presented to the data analyst, in decreasing order, is rearranged as follows: the dimension "Market" 506, the dimension "Income" 510, the dimension "Population" 512, the dimension "Age" 508, and the dimension "Time" 514. Therefore, even though the dimension "Income" 510 has an absolute numerical contribution 218 that is lower than that for the dimension "Age" 508, the best view of the exception is represented by Market*Income.

FIG. 6 is a block diagram of a computer system 600, suitable for employment of the present invention. System 600 may be implemented on a general-purpose microcomputer, such as one of the members of the IBM Personal Computer family, or other conventional workstation or graphics computer devices, or mainframe computers. In its preferred embodiment, system 600 includes a user interface 617, a user input device 607, a display 615, a printer 620, a processor 655, a read only memory (ROM) 650, a data storage device 122, such as a hard drive, a random access memory (RAM) 640, and a storage media interface 635, all of which are coupled to a bus 625 or other communication means for communicating information. Although system 600 is represented herein as a standalone system, it is not limited to such, but instead can be part of a networked system. For example, the computer system 600 may be connected locally or remotely to fixed or removable data storage devices 122 and data transmission devices 645. Further, the computer system 100, the server computer system 102, and the client computer system 104 also could be connected to other computer systems via the data transmission devices 645. Elements 100, 102, and 104 are described with reference to FIG. 1.

The RAM 640, the data storage device 122 and the ROM 650, are memory components 658 that store data 108 and instructions for controlling the operation of processor 655, which may be configured as a single processor or as a plurality of processors. The processor 655 executes a program 642 to perform the methods of the present invention, as described herein.

While the program 642 is indicated as loaded into the RAM 640, it may be configured on a storage media 630 for subsequent loading into the data storage device 122, the ROM 650, or the RAM 640 via an appropriate storage media interface 635. Storage media 630 can be any conventional storage media such as a magnetic tape, an optical storage media, a compact disk, or a floppy disk. Alternatively, storage media 630 can be a random access memory 640, or other type of electronic storage, located on a remote storage system.

Generally, the computer programs and operating systems are all tangibly embodied in a computer-readable device or media, such as the memory 658, the data storage device 122, or the data transmission devices 645, thereby making an article of manufacture, such as a computer program product, according to the invention. As such, the terms "computer program product" as used herein are intended to encompass a computer program 642 accessible from any computer readable device or media.

Moreover, the computer programs 642 and operating systems are comprised of instructions which, when read and executed by the computer system 100, the server computer system 102, and the client computer system 104, cause the computer system 100, the server computer system 102, and the client computer system 104 to perform the steps necessary to implement and use the present invention. Under control of the operating system, the computer programs 642 may be loaded from the memory 658, the data storage device 122, or the data transmission devices 645 into the memories 658 of the computer system 100, the server computer system 102, and the client computer system 104 for use during actual operations. Those skilled in the art will recognize many modifications may be made to this configuration without departing from the scope of the present invention.

The user interface 617 is an input device, such as a keyboard or speech recognition subsystem, for enabling a user to communicate information and command selections to the processor 655. The user can observe information generated by the system 600 via the display 615 or the printer 620. The user input device 607 is a device such as a mouse, track-ball, or joy-stick, which allows the user to manipulate a cursor on the display 615 for communicating additional information and command selections to the processor 655.

When operating in accordance with one embodiment of the present invention, the system 600 ranks and explains dimensions associated with exceptions in multidimensional data 110. The processor 655 and the program 642 collectively operate as a module for ranking and explanation of dimensions associated with exceptions in multidimensional data 110. It will be appreciated that the present invention offers many advantages over prior art techniques. Element 110 is described with reference to FIG. 1.

The present invention is typically implemented using one or more computer programs 642, each of which executes under the control of an operating system and causes the computer system 100, the server computer system 102, and the client computer system 104 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims

TRADEMARKS

IBM is a trademark or registered trademark of International Business machines, Corporation in the United States and other countries.

What is claimed is:

1. A computer-implemented method for interpreting and explaining selected exceptions in multidimensional data, at least one dimension being associated with each said selected exception, comprising:
    ranking each said dimension associated with each said selected exception by numerical importance;
    identifying said each dimension that needs to be re-evaluated for possible re-ranking of said each dimension;
    re-ranking said identified dimension, based on at least one weighting factor for said identified dimension; and
    presenting said re-ranked each dimension for selection of important views.

2. The computer-implemented method of claim 1, further comprising obtaining said at least one weighting factor by information from a user.

3. The computer-implemented method of claim 1, further comprising obtaining said at least one weighting factor by performing data mining runs for said multidimensional data.

4. The computer-implemented method of claim 1, further comprising obtaining said at least one weighting factor by invoking results of pre-computed data mining results of said multidimensional data.

5. The computer-implemented method of claim 1, further comprising presenting said re-ranked each dimension visually.

6. The computer-implemented method of claim 1, further comprising presenting said re-ranked each dimension linguistically.

7. The computer-implemented method of claim 1, further comprising selecting a two-dimensional said important view.

8. The computer-implemented method of claim 1, further comprising selecting a three-dimensional said important view.

9. A computer system for interpreting and explaining selected exceptions in multidimensional data, at least one dimension being associated with each said selected exception, comprising:
    each said dimension that is associated with each said selected exception and that is ranked by numerical importance;

said each dimension that is identified when said each dimension needs to be re-evaluated for possible re-ranking of said each dimension;

said identified dimension that is re-ranked, based on at least one weighting factor for said identified dimension; and said re-ranked each dimension that is presented for selection of important views.

10. The computer system of claim 9, further comprising said at least one weighting factor that is obtained by information from a user.

11. The computer system of claim 9, further comprising said at least one weighting factor that is obtained from data mining runs for said multidimensional data.

12. The computer system of claim 9, further comprising said at least one weighting factor that is obtained from pre-computed data mining results of said multidimensional data.

13. The computer system of claim 9, further comprising said re-ranked each dimension that is presented visually.

14. The computer system of claim 9, further comprising said re-ranked each dimension that is presented linguistically.

15. The computer system of claim 9, further comprising said important view being a two-dimensional view.

16. The computer system of claim 9, further comprising said important view being a three-dimensional view.

17. An article of manufacture comprising a program storage medium readable by a computer and embodying one or more instructions executable by said computer for interpreting and explaining selected exceptions in multidimensional data, at least one dimension being associated with each said selected exception, wherein:

computer-readable program code ranks each said dimension associated with each said selected exception by numerical importance;

computer-readable program code identifies said each dimension that needs to be re-evaluated for possible re-ranking of said each dimension;

computer-readable program code re-ranks said identified dimension, based on at least one weighting factor for said identified dimension; and computer-readable program code presents said re-ranked each dimension for selection of important views.

18. The article of manufacture of claim 17, wherein computer-readable program code obtains said at least one weighting factor by information from a user.

19. The article of manufacture of claim 17, wherein computer-readable program code obtains said at least one weighting factor by performing data mining runs for said multidimensional data.

20. The article of manufacture of claim 17, wherein computer-readable program code obtains said at least one weighting factor by invoking results of pre-computed data mining results of said multidimensional data.

21. The article of manufacture of claim 17, wherein computer-readable program code presents said re-ranked each dimension visually.

22. The article of manufacture of claim 17, wherein computer-readable program code presents said re-ranked each dimension linguistically.

23. The article of manufacture of claim 17, wherein computer-readable program code selects a two-dimensional said important view.

24. The article of manufacture of claim 17, wherein computer-readable program code selects a three-dimensional said important view.

* * * * *